United States Patent [19]

Fujiwara et al.

[11] Patent Number: 4,807,178
[45] Date of Patent: Feb. 21, 1989

[54] PROGRAMMABLE SEQUENCE CONTROLLER HAVING INDIRECT AND DIRECT INPUT/OUTPUT APPARATUS

[75] Inventors: Katsuhiro Fujiwara, Sakura; Takayuki Oshiga; Toshiro Kasahara, both of Narashino, all of Japan

[73] Assignee: Hitachi, Ltd., Tokyo, Japan

[21] Appl. No.: 930,232

[22] Filed: Nov. 13, 1986

[30] Foreign Application Priority Data

Nov. 16, 1985 [JP] Japan .................................. 60-255835

[51] Int. Cl.⁴ ........................ G06F 13/38; G06F 15/46
[52] U.S. Cl. .................................... 364/900; 364/140
[58] Field of Search ... 364/200 MS File, 900 MS File, 364/132, 138, 140, 141

[56] References Cited

U.S. PATENT DOCUMENTS

| | | | |
|---|---|---|---|
| 4,172,289 | 10/1979 | Struger et al. | 364/900 |
| 4,407,016 | 9/1983 | Bayliss | 364/200 |
| 4,604,688 | 8/1986 | Tone | 364/200 |
| 4,635,194 | 1/1987 | Burger et al. | 364/200 |
| 4,691,296 | 9/1987 | Struger | 364/900 |

FOREIGN PATENT DOCUMENTS

58-121405  7/1983  Japan .

Primary Examiner—Raulfe B. Zache
Assistant Examiner—Thomas C. Lee
Attorney, Agent, or Firm—Antonelli, Terry & Wands

[57] ABSTRACT

Data processing between selected I/O terminals is switched between processing by direct access to the I/O terminals and processing by indirect access through an image memory having a one-to-one correspondence to the I/O terminals.

8 Claims, 9 Drawing Sheets

PROGRAMMABLE SEQUENCE CONTROLLER HAVING INDIRECT AND DIRECT INPUT/OUTPUT APPARATUS

BACKGROUND OF THE INVENTION

1. Field of the Invention

The present invention relates to a sequence control system which uses a computer, and more particularly to an input/output (I/O) processor having a reduced sequence cycle and an improved input/output response.

2. Description of the Prior Art

A sequence control system for controlling a number of equipments has been known as a programmable sequence controller which uses a microcomputer. An example of such controller is shown in FIG. 1.

Figure 1:
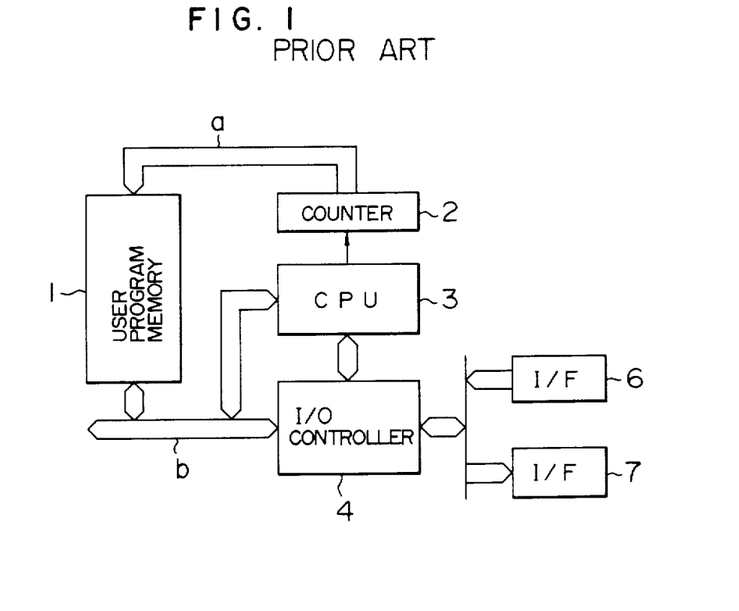
FIG. 1 is a block diagram of a typical prior art sequence controller.
Figure 2:
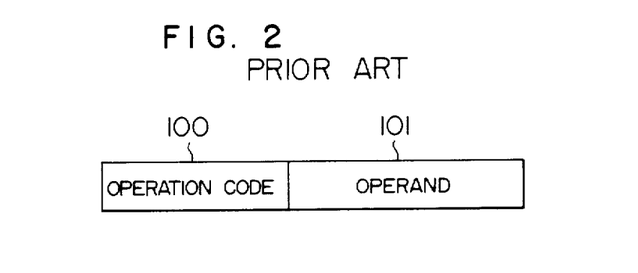
FIG. 2 shows a format of a user program used in the prior art.

In FIG. 1, a sequence processing procedure is written by a user in a user program memory 1. A CPU 3 sequentially sends addresses for the user program memory 1 to a program counter 2 so that a desired sequence processing procedure is read from the user program memory 1 to a memory data bus b. The data format thus sequentially read to the memory data bus b is shown in FIG. 2. It comprises an operation code field 100 in which the sequence processing procedure is stored and an operand field 101 in which an object number to be processed is stored. The operand field 101 of the memory data is supplied to an I/O controller 4, which designates the controlled object corresponding to the address designated by the operand field and reads therefrom and writes data therein through an input unit 6 and an output unit 7 which are interfaces to external. On the other hand, the operation code field 100 of the memory data is supplied to the CPU 3 and processing corresponding to the operation code is executed. The data of the corresponding controlled object is read or written through the I/O controller 4 as required.

Figure 3:
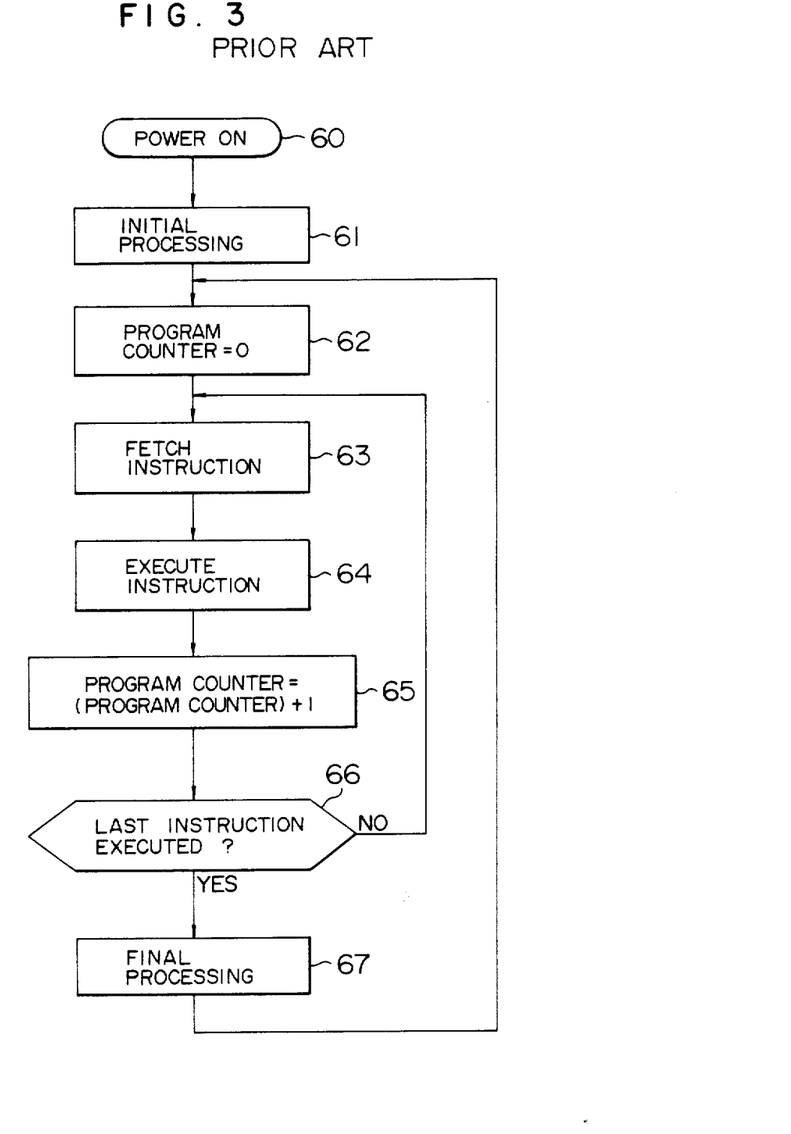
FIG. 3 shows a flow chart of an operation of the sequence controller shown in FIG. 1.

In such a programmable sequence controller, the CPU 3 usually operates in a process flow shown in FIG. 3.

When the programmable sequence controller is powered on (60), the CPU 3 carries out initial processing (61) including checks to determine validity of the user-written program, and then it starts processing.

In the processing, the program counter which points to the address of the user program is set to "0" (62) so that the user program is started from the beginning, an instruction is fetched (63) and executed (64). Thus, one step of operation is completed. The program counter is incremented (65) to execute the next step, and the next instruction is fetched. When the program counter is incremented, whether the instruction is the last one or not is checked (66), and if it is not the last one, the process returns to the step 63. If it is the last one, final processing (67) to be described later is carried out and the program counter is set to "0" (62) so that the program is executed from the beginning.

Figure 4:
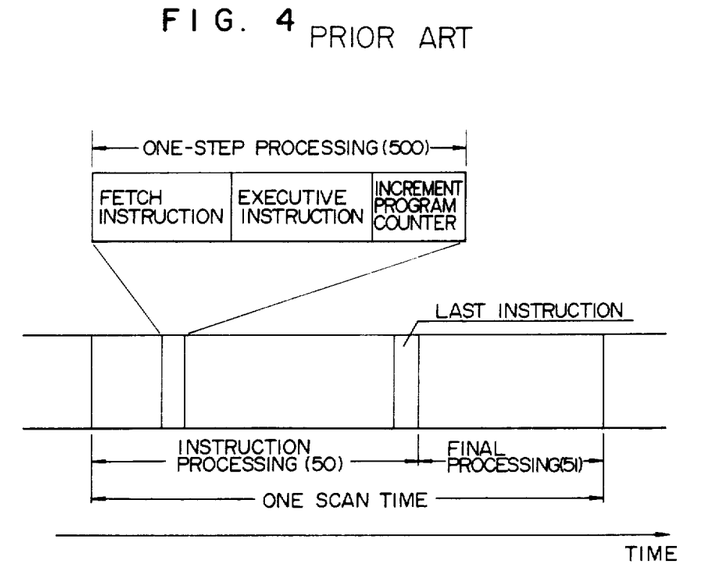
FIG. 4 shows an execution status of a known user program.

Thus, the programmable sequence controller sequentially and cyclically executes the user-written program. FIG. 4 illustrates this. One scan time (cyclic time) consists of a series of instruction processing (50) and final processing (51), and the instruction processing (50) is aggregation of one-step processings (500).

One of the important specifications required for the programmable sequence controller is an I/O response. It is a big problem to assure a high I/O response speed. If the response speed is high, a higher response to the data from the controlled object is assured and a control command is more rapidly issued as a result, control precision is improved and the types and number of the controlled machines can be increased.

In the prior art programmable sequence controller, the following approaches A and B have been adapted.

A. The total scan time is reduced so that the response speed is increased.

Figure 5:
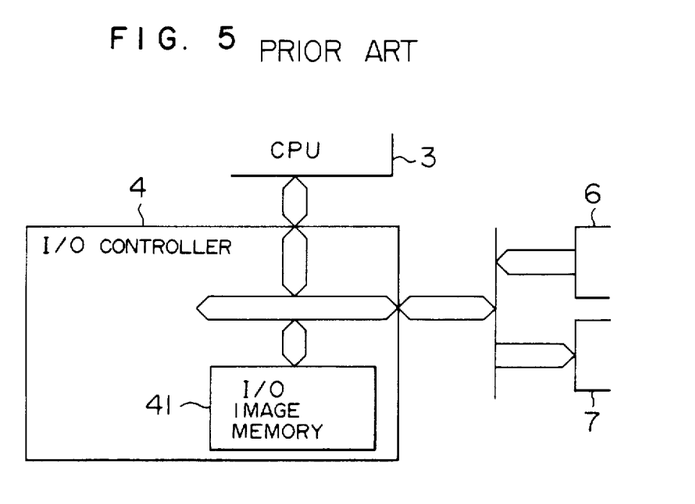
FIG. 5 shows a block diagram of a typical prior art sequence controller.
Figure 6:
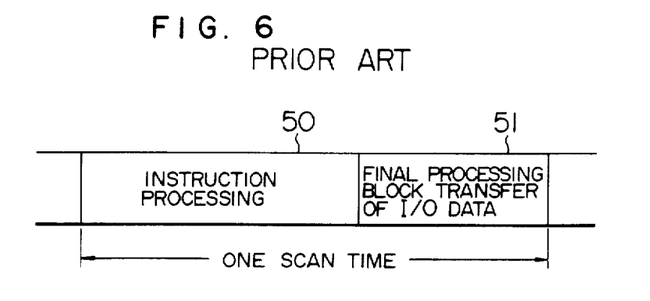
FIG. 6 shows an execution status of one scan time of a known user program.

In this approach, as shown in FIG. 5, an I/O image memory 41 is provided in the I/O controller 4, and the processing by the CPU 3 in each scan time is carried out in a manner shown in FIG. 6, in which the content of the final processing (51) is exchanged between an external device and the image memory 41 through the input unit 6 and the output unit 7. On the other hand, the content of the instruction processing (50) is the aggregation (500) of the one-step processings (63), (64), (65), and the I/O data are read and written only between the image memory 41 and the CPU 3. In the approach A, the data exchange with the external devices through the input unit 6 and the output unit 7 is carried out in the final processing (51) collectively for several data, and in the processing of those data, the image memory 41 is sequentially accessed. As a result, the time required for each step is reduced, the total scan time is reduced and the response speed is increased.

The reason for the reduction of the scan time is explained below.

Figure 7:
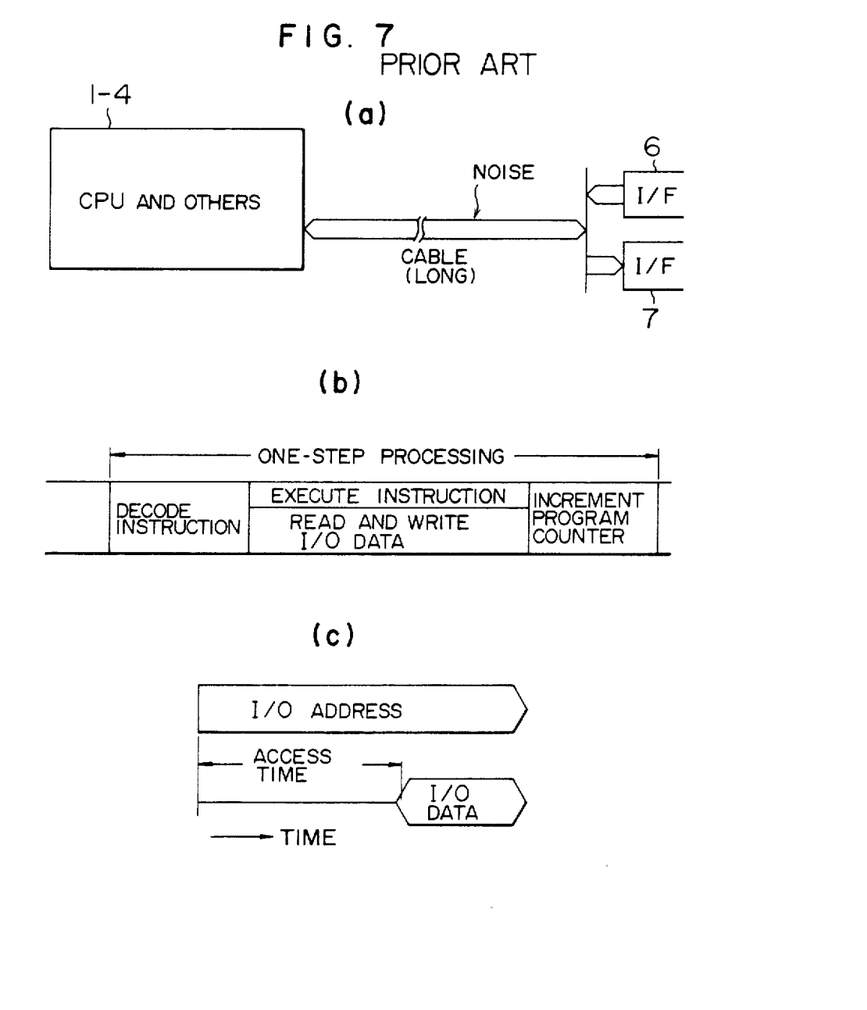
FIGS. 7(a) 7(b) and 7(c) show connection between a main part of the sequence controller and an I/O interface.

As shown in FIG. 7(a), units 1–4 which include the CPU 3 is usually physically spaced from the input unit 6 and the output unit 7 and, they are coupled by a relatively long cable. Accordingly, the noise environment is bad. Therefore, if the CPU 3 without the image memory 41 accesses the data one by one to the external device, it is necessary that the time from the output of the address to the read or write time of the data (access time) is sufficiently long as shown in FIG. 10(c) in order to avoid the influence of the noise. As a result, the long access time is required for each step and the sum of them appears in one scan time. Thus, the total scan time is long.

Figure 8:
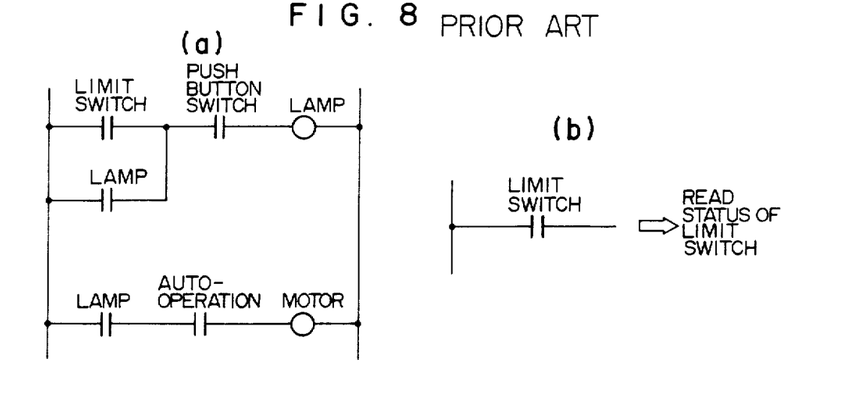
FIGS. 8(a) and 8(b) show a sequence ladder, 10

The program of the programmable sequence controller is usually written in a manner shown in FIG. 8(a) and executed in a manner shown in FIG. 8(b). The sequence controller has many external inputs/outputs, and it often has more than 256 inputs/outputs. Accordingly, each time they appear in the sequence program, the access times therefor are added.

In the approach A, the external inputs/outputs are not transferred one by one but they are transferred collectively for a plurality of (usually 16) inputs/outputs in the final processing (51). Accordingly, the total time is much shorter than the sum of the access times and the overall scan time is reduced.

However, in the approach A, the frequency of control to the external devices cannot be shorter than one scan time. In this approach, the external inputs are collectively read and processed, and then the results are collectively outputted. As a result, the response frequency is not shorter than one scan time. This may be an unacceptable shortcoming to a particular controlled object and therefore the range of application of approach A is narrow.

B. One instruction is executed a plurality of times in one scan time.

This approach is a contrast to the approach A. The I/O data are read and written when each instruction is executed. In this approach, an output instruction may be written immediately after an input instruction has been executed, and several such instructions are repeatedly written in the program. As a result, an apparent scan time is reduced and the I/O response is improved.

However, in the approach B, since one instruction is executed a plurality of times in one scan time, the total number of steps increases and the total scan time increases.

The programmable sequence controller by the approach B is disclosed in JP-A-No. 58-121405, published on 7/19/1983.

SUMMARY OF THE INVENTION

It is an object of the present invention to provide an I/O processor of a programmable sequence controller which attains sufficient reduction of a total scan time and sufficient high response speed to a controlled object.

In order to achieve the above object, the present invention provides a programmable sequence controller which collectively exchanges a plurality of data at one time with an external device through an I/O image memory and selectively exchanges data directly with the external device or exchanges data with the I/O image memory in accordance with a user program.

By this arrangement, the current status signal of the data I/O terminal can be read without routing the I/O image memory while maintaining the advantage of the approach A, and the result of the CPU can be immediately sent to the data output terminal. Thus, the response speed to the data to which the immediate I/O instruction is directly programmed is increased.

DESCRIPTION OF THE PREFERRED EMBODIMENTS

An I/O processing method in the programmable sequence controller of the present invention is now explained with reference to the embodiments.

Figure 9:
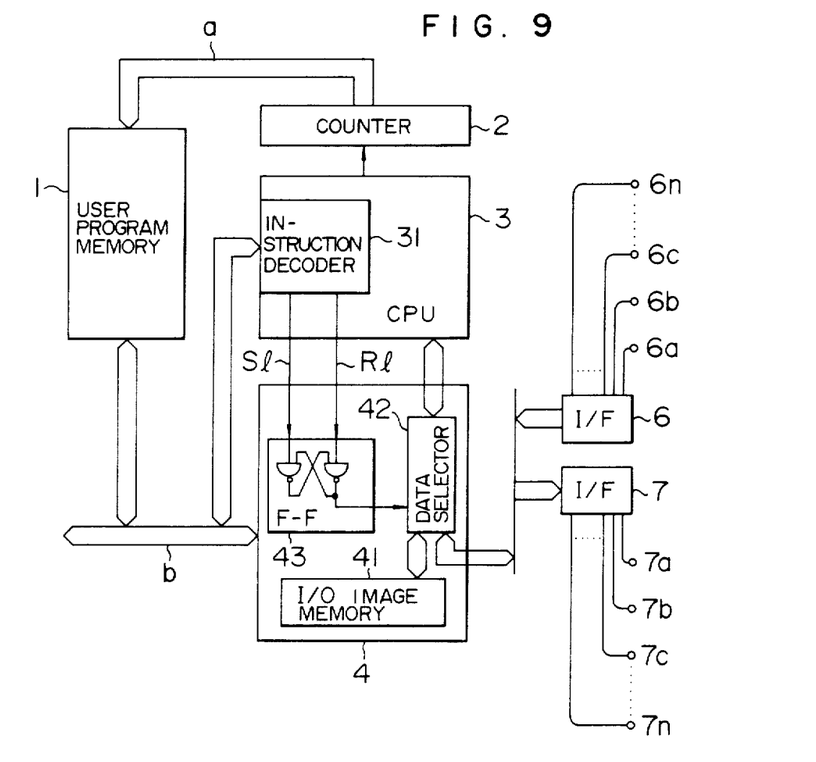
FIG. 9 shows a block diagram of an embodiment of a sequence controller of the present invention.

FIG. 9 shows an embodiment of the present invention. Numeral 31 denotes an instruction decoder provided in a CPU 3, numeral 42 denotes data selector provided in an I/O controller 4, and numeral 43 denotes a flip-flop provided in the I/O controller 4. The other numerals are identical to those shown in FIGS. 1 and 5. In FIGS. 1 and 5, a plurality of data input terminals $6a$, $6b$, ..., $6n$ connected to the interface 6 and a plurality of data output terminals $7a$, $7b$, ..., $7n$ connected to the interface 7 are omitted.

When a direct I/O set instruction $D_s$ and a direct I/O reset instruction $D_r$ as shown in FIG. 10(a) are applied to the CPU 3, control lines (set line $S_l$ and reset line $R_l$) connected to the outputs of the instruction decoder 31 change depending on the instructions.

In the I/O controller 4, the set line and the reset line are connected to a set input and a reset input of the flip-flop 43. Each time the direct I/O set instruction $D_s$ or the direct I/O reset instruction $D_r$ appears, the output of the flip-flop 43 changes and it is supplied to the data selector 42. Thus, the data selector 42 selects one of an external I/O data directly supplied from the input interface 6 and the output interface 7 or a data from the I/O image memory 41, and supplies the selected data to the CPU 3.

The operation of the present embodiment is now explained.

Figure 10:
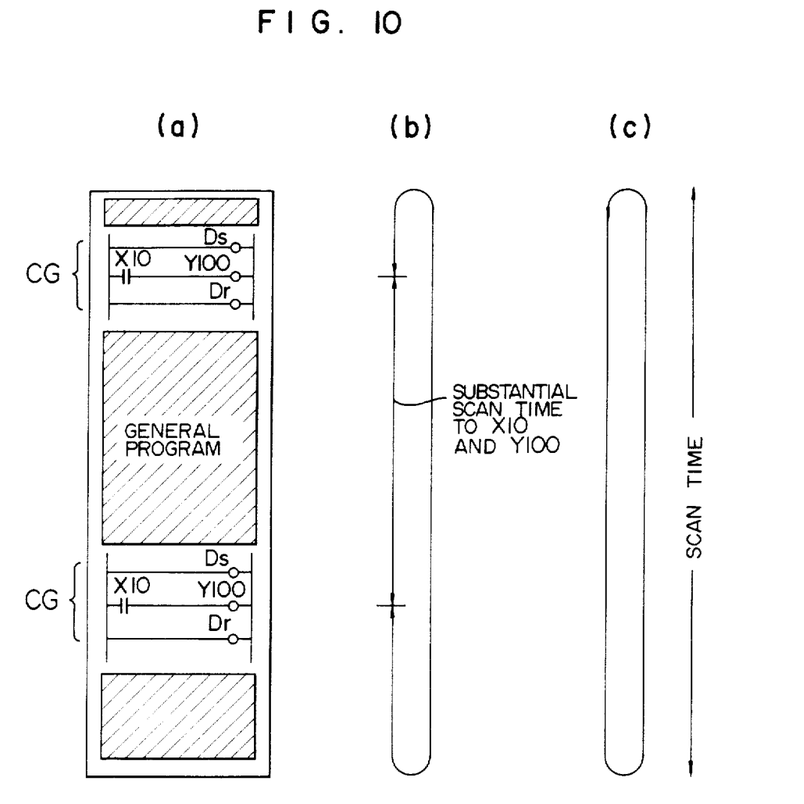
FIG. 10(a) 10(b) and 10(c) show an operation of the sequence controller of the present invention.

Let us assume that none of the direct I/O set instruction $D_s$ and the direct I/O reset instruction $D_r$ shown in FIG. 10 is contained in the program stored in the user program memory 1.

In this case, the data selector 42 keeps selecting the image memory 41, and the processing for each step is executed by reading or writing data from or to the image memory 41. This is the same as the operation of the approach A and the control is attained with a sufficiently short total scan time.

Let us assume that there is an external device which requires a special high response speed, and an I/O pair therefor are $X_{10}$ (input) and $Y_{100}$ (output)

In this case, as shown in FIG. 10(a), an instruction set which comprises an, instruction CG to the I/O pair $X_{10}$ and $Y_{100}$ sandwiched between the direct I/O set instruction $D_s$ and the direct I/O reset instruction $D_r$ is included a plurality of times in a series of programs and the control is attained by executing the programs.

Thus, each time the program step encounters the instruction set CG, the flip-flop 43 is set by the direct I/O set instruction $D_s$ and the data selector 42 switches the CPU 3 from the image memory 41 to the direct access to the interfaces 6 and 7. Under this condition, the $X_{10}$ and $Y_{100}$, and the flip-flop 43 is again reset by the direct I/O reset instruction $D_r$ and the data selector 42 again selects the image memory 41. This operation is repeated a plurality of times in one scan time.

In this case, the control to the input $X_{10}$ and the output $Y_{100}$ is of high response, and the control interval is much shorter than one scan time as shown in FIG. 10(b). The one scan time under this condition is shown in FIG. 10(c).

The data exchange for the instructions of the program other than the instruction set CG is collectively done as is done in the approach A. Accordingly, the total scan time is sufficiently reduced.

In FIG. 10, the instruction set CG appears two times in the series of programs. If it appears more frequently, the control interval will be more shortened.

Even if the instruction set CG appears only one time, the output response speed for the instruction set CG is improved over the approach A and the scan time is shortened than that in the approach B.

Figure 11:
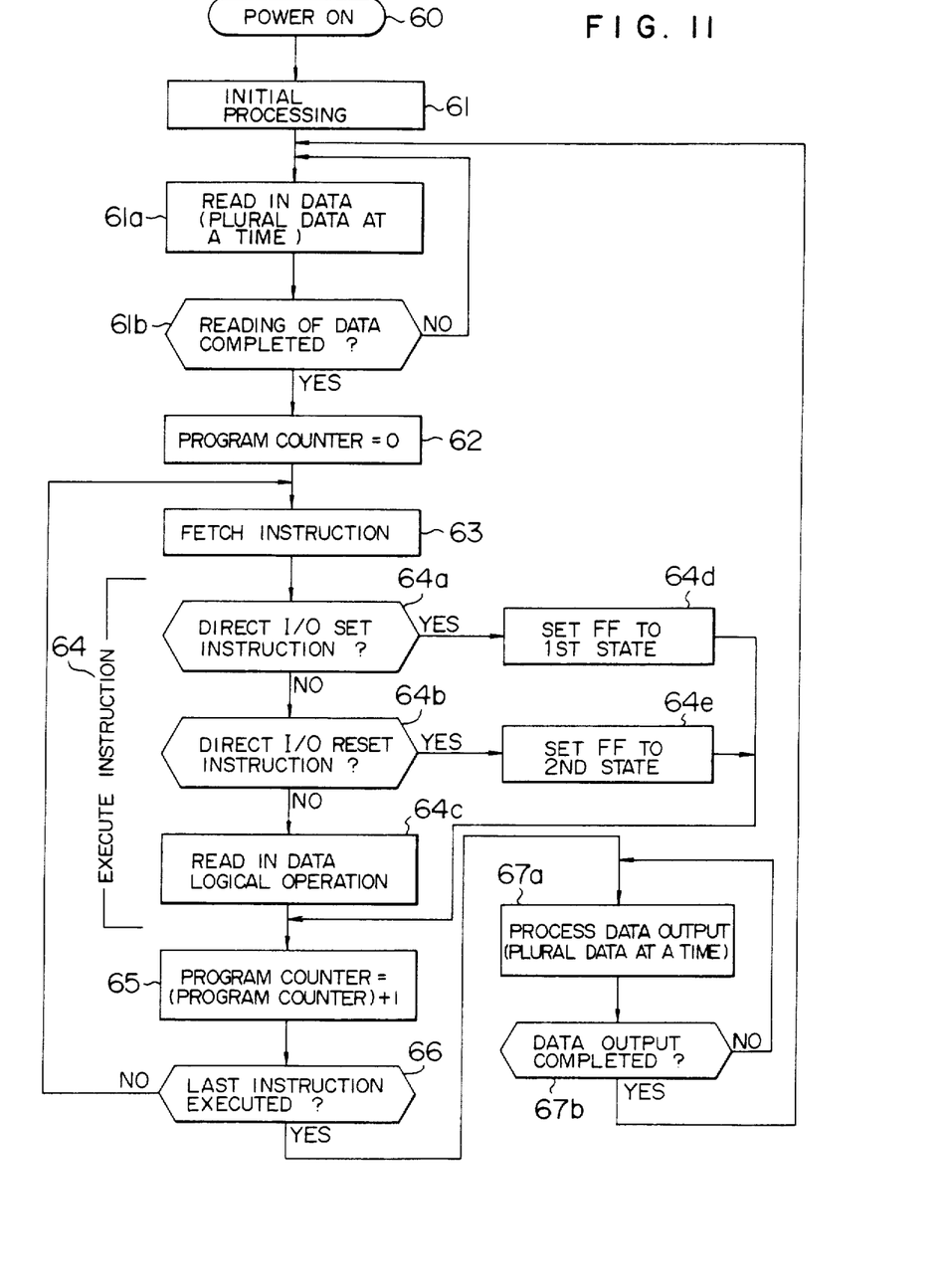
FIG. 11 shows an flow chart of an operation of the sequence controller of FIG. 9, and FIGS. 12 and 13 show execution status of the user program shown in FIG. 8.

FIG. 11 shows a flow chart of the operation of the present embodiment.

Only a difference from the flow shown in FIG. 3 is explained here. In the flow of FIG. 11, after the initial processing 61, the data status at the data input terminals 6a, 6b, ..., 6n and the data output terminals 7a, , 7b, ..., 7n are read into the I/O image memory 41, a plurality of status at a time, from the input interface 6 and the output interface 7, in a step 61a. In a step 61b, whether all of the data status of the data input terminals and the data output terminals have been read into the I/O image memory 41 or not is checked. If the decision is NO, the process returns to the step 61a, and if the decision is YES, the process proceeds to a step 62. The steps 62 and 63 are carried out in the manner shown in FIG. 3.

The step 64 in FIG. 3 corresponds to three steps 64a, 64b and 64c in FIG. 11. In the step 64a, whether the one-step instruction read in the step 63 includes the direct I/O set instruction $D_s$ or not is checked. It is checked by the instruction decoder 31. If the direct I/O instruction $D_s$ is included, the flip-flop 43 is set to the first state (64d) and the data selector causes the CPU 3 to read the data directly from the I/O interfaces 6 and 7. If the instruction read in the step 63 is not the direct I/O instruction $D_s$, the process proceeds to a step 64b. In the step 64b, whether the one-step instruction read in the step 63 includes the direct I/O reset instruction $D_r$ or not is checked by the instruction decoder 31. If the decision is YES, the flip-flop 43 is set to the second state (64e) and the data selector 42 causes the CPU 3 to connect with the I/O image memory 41. If the reset instruction is not present, the process proceeds to the following step 64c.

In the step 64c, essentially the same operation as that of the step 64 in FIG. 3 is carried out. The CPU 3 reads in the data from the I/O interfaces 6 and 7 or the I/O image memory 41, and performs logical operations based on the read-in data.

In steps 67a and 67b, the data in the I/O image memory 41 are sent, a plurality of data at one time, to the data output terminals 7a, 7b, ..., 7n.

Figure 12:
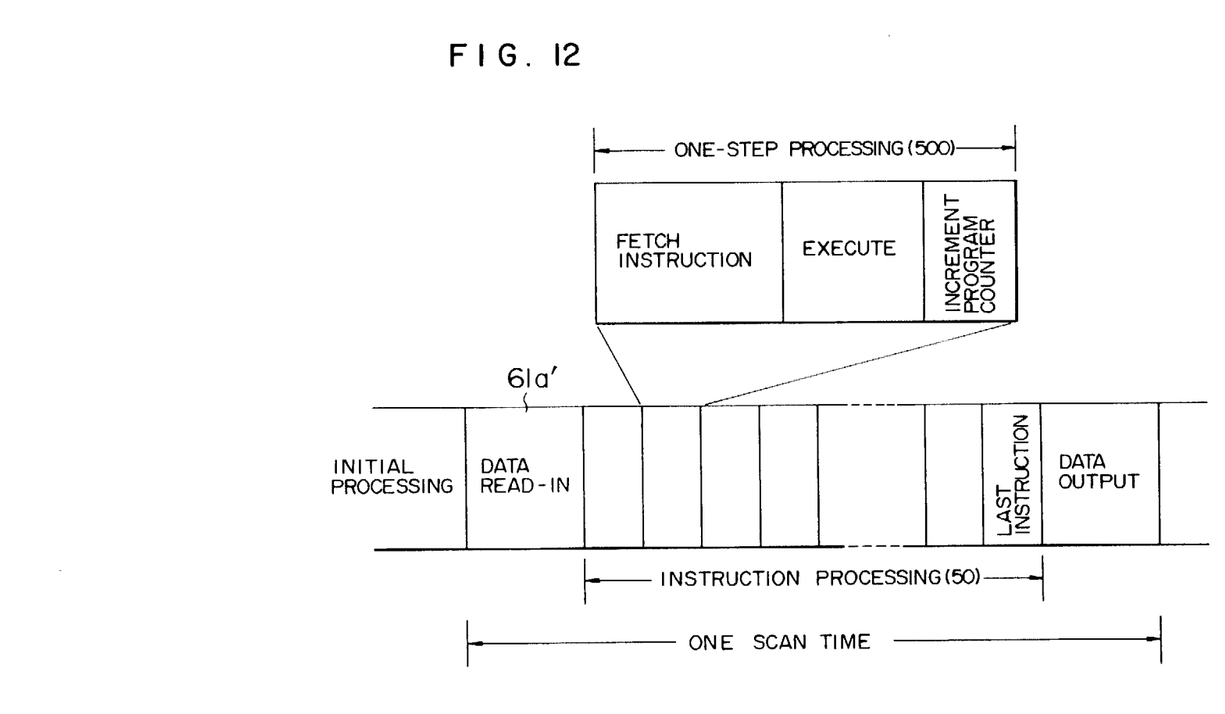

In the step 67b, whether all data have been sent or not is checked. FIG. 12 shows a time sequence chart of the program structure described above. A big difference in FIG. 12 from FIG. 4 is that a signal read-in step 61a' is prior to the instruction processing step 50.

Figure 13:
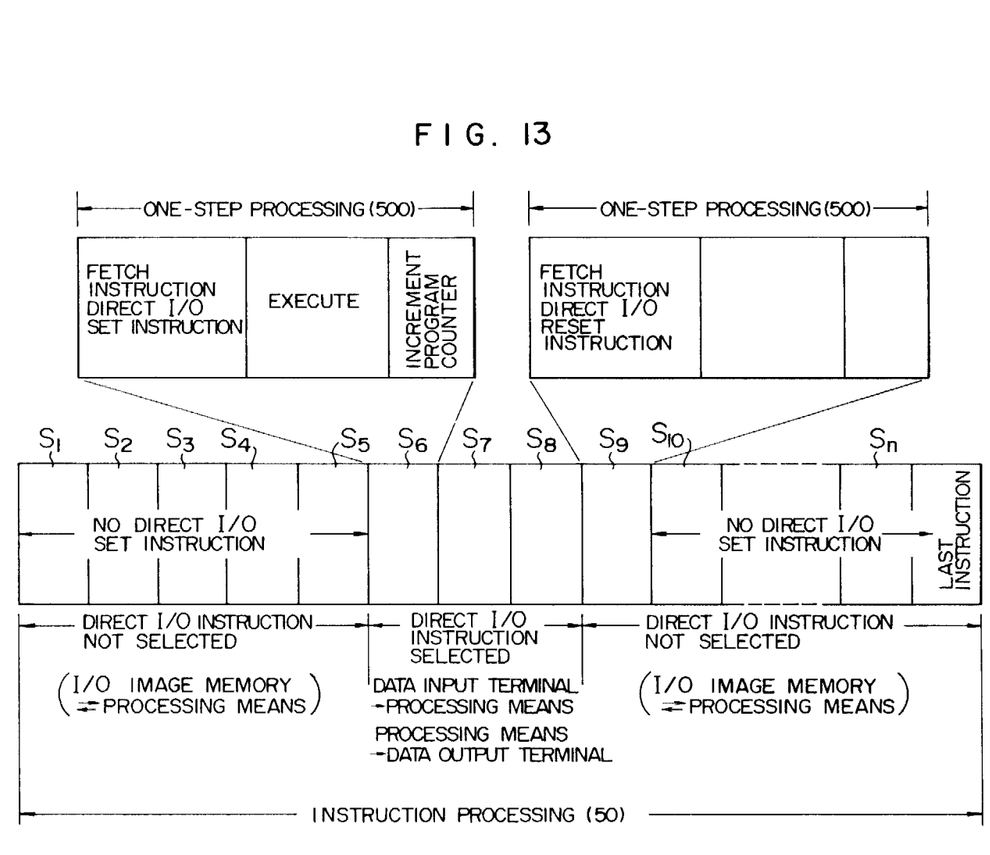

FIG. 13 shows an operation where the direct I/O set instruction $D_s$ is included in $S_6$ of the instruction processing step 50 and the direct I/O reset instruction $D_r$ is included in $S_9$. In steps $S_1-S_5$, the data of the I/O image memory is read into the CPU 3 and the operation result of the CPU 3 is supplied to the I/O image memory. The same operation is carried out in steps $S_{10}-S_n$. In steps $S_6-S_9$, the data at the data input terminals are directly read into the CPU 3, and the operation result of the CPU 3 is directly sent to the data output terminals.

In the present embodiment, the I/O image memory reads in the data at the data output terminals through the data selector. Alternatively, the data may be directly supplied from the CPU.

The direct input instruction may be effective only when the data is read from the data I/O interface, or direct output instruction may be effective only when the data is sent to the data output interface.

While the preferred embodiment of the present invention has been shown and described the present invention is not limited to the embodiment but various modifications thereof may be made without departing from the sprit of the present invention.

We claim:

1. A programmable sequence controller comprising:

user program memory means for storing a sequence processing procedure having a direct input/output (I/O) instruction;

processor means connected to said user program memory means for cyclically performing logical processing in accordance with said sequence processing procedure;

instruction decoder means provided in said processor means for detecting said direct I/O instruction within said sequence processing procedure;

I/O control means connected to said processor means for controlling the input and output of data to and from said processor means;

data selector means provided in said I/O control means and connected to said processor means through a data bus for selectively switching between direct I/O of data and indirect I/O of data:

a plurality of data input terminals connected to said data selector means for providing direct input of data;

a plurality of data output terminals connected to said data selector means for providing direct output of data;

an I/O image memory provided in said I/O control means and connected to said data selector means for storing data status of said data input terminals and said data output terminals, said I/O image memory providing indirect I/O of data; and switching means connected to said instruction decoder means and said data selector means for causing said data selector means to selectively switch between direct I/O of data and indirect I/O of data in response to an output from said instruction decoder means such that when a direct I/O instruction is detected by said instruction decoder means and an indication thereof is output to said switching means, said switching means in response thereto causes said data selector means to select direct I/O of data wherein said plurality of data input terminals and said plurality of data output terminals are connected to said data selector means, and when said direct I/O instruction is not detected by said instruction decoder means and an indication thereof is output to said switching means, said switching means in response thereto causes said data selector means to select indirect I/O of data wherein said I/O image memory is connected to said data selector means.

2. A programmable sequence controller comprising:

user program memory means for storing a sequence processing procedure having a direct input/output (I/O) set instruction and a direct I/O reset instruction;

processor means connected to said user program memory means for cyclically performing logical processing in accordance with said sequence processing procedure;

instruction decoder means provided in said processor means for detecting said direct I/O set instruction and said direct I/O reset instruction within said sequential processing procedure;

I/O control means connected to said processor means for controlling the input and output of data to and from said processor means;

data selector means provided in said I/O control means and connected to said processor means through a data bus for selectively switching between direct I/O of data and indirect I/O of data;

a plurality of data input terminals connected to said data selector means for providing direct input of data;

a plurality of data output terminals connected to said data selector means for providing direct output of data;

an I/O image memory provided in said I/O control means and connected to said data selector means for storing data status of said data input terminals and said data output terminals, said I/O image memory provides indirect I/O of data; and switching means connected to said instruction decoder means and said data selector means for causing said data selector means to selectively switch between direct I/O of data and indirect I/O of data in response to an output from said instruction decoder means such that when a step including a direct I/O set instruction is detected, in a sequence processing procedure, by said instruction decoder means and an indication thereof is output to said switching means, said switching means in response thereto causes said data selector means to select direct I/O of data wherein said plurality of data input terminals and said plurality of data output terminals are connected to said data selector means for a time period starting from said step until a step including a direct I/O reset instruction is detected, and when a step including a direct I/O reset instruction is detected by said instruction decode means and an indication thereof is output to said switching means, said switching means in response thereto causes said data selector means to select indirect I/O of data wherein said I/O image memory is connected to said data selector means, said data selector means being connected to said I/O image memory at all times except when a direct I/O set instruction is detected.

3. A programmable sequence controller according to claim 2 wherein said switching means includes a flip-flop provided in said I/O control means and connected to said data selector means, said flip-flop being set to a first state when said instruction decoder means detects a direct I/O set instruction and to a second state when said instruction decoder means detects a direct I/O reset instruction, wherein said first state of said flip-flop, causes said data selector means to be connected to one or more of said data input and output terminals thereby inputting data from one or more of said data input terminals to said processor means and outputting results of logical operations performed by said processor means to selected one or ones of said data output terminals, and wherein said second state of said flip-flop, causes said data selector to be connected to said I/O image memory thereby inputting data from said I/O image memory to said processor means and outputting results of logical operations performed by said processing means to said I/O image memory.

4. A programmable sequence controller comprising:

user program memory means for storing a sequence processing procedure having a direct output instruction;

processor means connect to said user program memory means for cyclically performing logical processing in accordance with said sequence processing procedure;

instruction decoder means provided in said processor means for detecting a direct output instruction within said sequence processing procedure;

I/O control means connected to said processor means for controlling input and output (I/O) of data to and from said processor means;

data selector means provided in said I/O control means and connected to said processor means through a data bus for selectively switching between direct output of data and indirect I/O of data;

a plurality of data output terminal connected to said data selector means for providing direct output of data;

an I/O image memory provided in said I/O control means and connected to said data selector means for storing data status of said data output terminals, said I/O image memory provides indirect I/O of data;

switching means connected to said instruction decoder means and said data selector means for causing said data selector means to selectively switch between direct output of data and indirect I/O of data in response to an output from said instruction decoder means such that when a direct output instruction is detected by said instruction decoder means and an indication thereof is output to said switching means, said switching means in response thereto causes said data selector means to select direct output of data wherein said plurality of data output terminals are connected to said data selector means, otherwise, said I/O image memory is connected to said data selector means.

5. A programmable sequence controller comprising:

user program memory means for storing a sequence processing procedure having a direct input instruction;

processor means connected to said user program memory means for cyclically performing logical processing in accordance with said sequence processing procedure;

instruction decoder means provided in said processor means for detecting a direct input instruction within said sequence processing procedure;

I/O control means connected to said processor means for controlling the input and output (I/O) of data to and from said processor means;

data selector means provided in said I/O control means and connected to said processor means through a data bus for selectively switching between direct input of data and indirect I/O of data;

a plurality of data input terminals connected to said data selector means for providing direct input of data;

an I/O image memory provided in said I/O control means and connected to said data selector means for storing data status of said data input terminals, said I/O image memory provides indirect I/O of data; and switching means connected to said instruction decoder means and said data selector means for causing said data selector means to selectively switch between direct input of data and indirect I/O of data in response to an output from said instruction decoder means such that when a direct input instruction is detected by said instruction decoder means and an indication thereof is output to said switching means, said switching means in response thereto causes said data selector means to select direct input of data wherein said plurality of data input terminals are connected to said data selector means, otherwise, said I/O image memory is connected to said data selector means.

6. A programmable sequence controller comprising:

user program memory means for storing sequence processing procedure having an area for storing a direct input/output (I/O) set instruction and a direct I/O reset instruction;

processor means connected to said user program memory means for cyclically performing logical processing in accordance with said sequence processing procedure;

instruction decoder means provided in said processor means for detecting a direct I/O set instruction and a direct I/O reset instruction in said area;

I/O control means connected to said processor means for controlling the input and output of data to and from said processor means;

data selector means provided in said I/O control means and connected to said processor means through a data bus for selectively switching between direct I/O of data and indirect I/O of data;

a plurality of data input terminals connected to said data selector means for providing direct input of data;

a plurality of data output terminal connected to said data selector means for providing direct output of data;

an I/O image memory provided in said I/O control means and connected to said data selector means for storing data status of said data input terminals and said data output terminals, said I/O image memory provides indirect I/O of data; and switching means connected to said instruction decoder means and said data selector means for causing said data selector means to selectively switch between direct I/O of data and indirect I/O of data in response to an output from said instruction decoder means such that when a direct I/O set instruction is detected in said area of said sequence processing procedure by said instruction decoder means and an indication thereon is output to said switching means, said switching means in response thereto causes said data selector means to select direct I/O of data wherein said plurality of data input terminals and said plurality of data output terminals are connected to said data selector means for a time period starting from detection of said direct I/O set instruction until a direct I/O reset instruction is detected, causing said data selector means to select indirect I/O of data wherein said I/O image memory is connected to said selector means, at all other times when a direct I/O set instruction is not detected, said I/O image memory is connected to said data selector means.

7. A programmable sequence controller according to claim 1, wherein said switching means is provided in said I/O control means.

8. A programmable sequence controller according to claim 2, wherein said switching means is provided in said I/O control means.

* * * * *